(12) United States Patent
Cheng et al.

(10) Patent No.: US 7,694,148 B2
(45) Date of Patent: *Apr. 6, 2010

(54) METHOD AND SYSTEM FOR MANAGING THE DISPLAY OF SENSITIVE CONTENT IN NON-TRUSTED ENVIRONMENTS

(75) Inventors: Tsz Cheng, Grand Prairie, TX (US); Brent Cossey, Roanoke, TX (US); Gregory Fitzpatrick, Keller, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/401,680

(22) Filed: Mar. 11, 2009

(65) Prior Publication Data

US 2009/0172408 A1    Jul. 2, 2009

Related U.S. Application Data

(63) Continuation of application No. 10/730,400, filed on Dec. 8, 2003, now Pat. No. 7,523,316.

(51) Int. Cl.
*G06F 21/00* (2006.01)
(52) U.S. Cl. .................................................. 713/183
(58) Field of Classification Search .................. 713/183
See application file for complete search history.

(56) References Cited

U.S. PATENT DOCUMENTS

| 5,615,277 | A | 3/1997 | Hoffman |
| 6,055,637 | A | 4/2000 | Hudson et al. |
| 6,226,372 | B1 | 5/2001 | Beebe et al. |
| 6,260,145 | B1 | 7/2001 | Komura et al. |
| 6,373,967 | B2 | 4/2002 | Pu et al. |
| 6,381,579 | B1 | 4/2002 | Gervais et al. |
| 6,397,198 | B1 | 5/2002 | Hoffman et al. |
| 6,498,861 | B1 | 12/2002 | Hamid et al. |
| 6,578,081 | B1 | 6/2003 | Tominaga et al. |
| 6,674,368 | B2 | 1/2004 | Hawkins et al. |
| 7,140,035 | B1 | 11/2006 | Karch |
| 2003/0115481 | A1 | 6/2003 | Baird et al. |
| 2003/0217137 | A1 | 11/2003 | Roese et al. |
| 2004/0123150 | A1 | 6/2004 | Wright et al. |

*Primary Examiner*—Kambiz Zand
*Assistant Examiner*—Harris C Wang
(74) *Attorney, Agent, or Firm*—Novak Druce + Quigg

(57) ABSTRACT

A method (10) for managing the display of sensitive content in non-trusted environments can include the steps of interrogating (12) a list of policies associated with a given user and a physical device, determining (14) a location of the physical device, comparing (18) the location of the physical device with a list of trusted locations, and enforcing (20) a plurality of rules contained in the policy by limiting or restricting access to sensitive information based on the location.

12 Claims, 2 Drawing Sheets

METHOD AND SYSTEM FOR MANAGING THE DISPLAY OF SENSITIVE CONTENT IN NON-TRUSTED ENVIRONMENTS

CROSS-REFERENCE TO RELATED APPLICATION

This application is a continuation of, and accordingly claims the benefit of, U.S. patent application Ser. No. 10/730,400, now issued U.S. Pat. No. 7,523,316, which was filed on Dec. 8, 2003, and which is hereby incorporated by reference in its entirety.

TECHNICAL FIELD

This invention relates to the field of data management and more particularly to a method and system of managing sensitive content in non-trusted environments.

DESCRIPTION OF THE RELATED ART

In the current business environment, documents or other objects containing sensitive or confidential content can be viewed on a user's portable computing device in virtually any location. For instance, a user can view confidential corporate documents on his/her machine in a variety of public or "non-trusted" areas such as an airport, airplane, or hotel restaurant. Many employees tend to pay very little attention to their surrounding environment when it comes to confidential documents due to time constraints, or simply lack of attention. As a result, employees from competitive firms are can potentially view material that is intended solely for a given employees' consumption. Additionally, employees of the same firm may inadvertently share confidential information that is not intended for both employees.

Today, enterprises have few tools to enforce corporate data security policies in these situations. For data that permanently resides both on a portable computing device (like an IBM Thinkpad or a personal Digital Assistant or PDA) as well as data that is delivered to such devices dynamically over a network, companies have no effective methods to prevent or restrict mobile employees from viewing sensitive data in non-trusted environments.

SUMMARY OF THE INVENTION

Embodiments in accordance with the invention can enable and enforce a corporate-wide security policy regardless of whether an employee is working in a company office ("trusted area") or in some remote location ("non-trusted" area). The service can operate as an extension to existing operating systems, middleware, or end-user applications. It is also possible to extend the function to a system's firmware, enabling restrictions on a device's being used at all (i.e., restrictions on boot-up capability).

In a first aspect of the invention, a method for managing the display of sensitive content in non-trusted environments can include the steps of interrogating a list of policies associated with a given user and a physical device, determining a location of the physical device, comparing the location of the physical device with a list of trusted locations, and enforcing a plurality of rules contained in the policy, wherein access to sensitive information is limited or restricted based on the location.

In a second aspect of the invention, a system for managing the display of sensitive content in non-trusted environments can include a memory, a display, and a processor coupled to the memory and the display. The processor can be programmed to interrogate a list of policies associated with a given user and a physical device, determine a location of the physical device, compare the location of the physical device with a list of trusted locations, and enforce a plurality of rules contained in the policy, wherein access to sensitive information is limited or restricted based on the location.

In a third aspect of the invention, a computer program has a plurality of code sections executable by a machine for causing the machine to perform certain steps as described in the method and systems above.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

Figure 1:
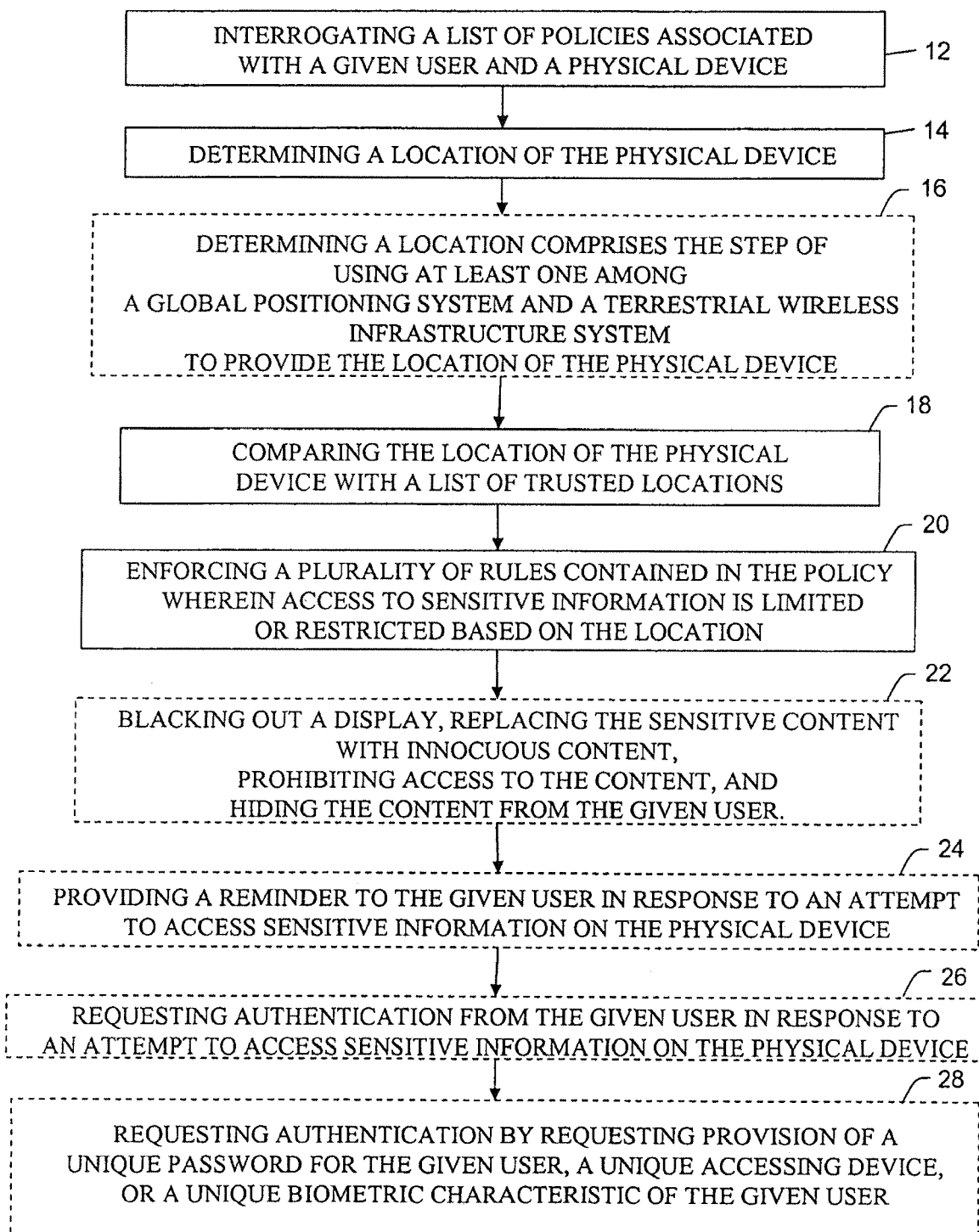
FIG. 1 is a flow diagram illustrating a method for managing the display of sensitive content in non-trusted environments in accordance with the present invention.

Referring to FIG. 1, a method 10 for managing the display of sensitive content in non-trusted environments can include the step 12 of interrogating a list of one or more corporate policies associated with the given user and physical device. (Multiple policies may be complementary, that is, a basic policy may describe general rules, whereas complementary policies describe more details, exception conditions, etc.) Policy data may be instantiated in either clear text or encrypted, using either proprietary formats or industry-standard formats, as they become available. This policy data may be acquired either locally from the device to be managed or dynamically via access to the corporate network—either directly attached to the network or indirectly via the Internet or other service. Each corporate policy may be coarse-grained (e.g., permitting no access to any data in a non-trusted zone) or fine-grained (e.g., permitting no access to specific company-confidential data elements within certain proscribed classes of documents). Upon interrogation of the policy or policies, the invention proceeds to enforce the rules at step 20 contained in the policy.

In this particular embodiment, before the rules are enforced, the location of the physical device can be determined at step 14. Since the method 10 is primarily intended to operate when the user is physically located in a non-trusted location, awareness of the user's (approximate) location will be crucial in this embodiment. To enable this capability, the service can make use of a positioning technology, such as a GPS (Global Positioning Satellite) system and/or a wireless infrastructure (cellular network or WIFI) which could determine a user's location as indicated at step 16. While GPS is suitable for outdoor environments and could be accessed anywhere globally, wireless infrastructure is suitable for both indoor and outdoor environments, but is subject to limited availability based on location. A combination of the two technologies for retrieving location information can also be used. Other location technologies may be substituted without deviating from the spirit of this invention.

The invention would next compare at step 18 the determined location to the organization's list of trusted zones, which may be imbedded within the corporate policy object or elsewhere. (Note that the organization may include a user-specific trusted zone, such as a user's home address.) This embodiment of the invention could then determine whether the user is in a "trusted" or "non-trusted" zone (e.g., corporate office vs. airplane) and prompt the user with the actions dictated by the appropriate corporate policy. As a user moves to new locations, the system can recognize the new location and re-compares locations to the list of trusted zones and enforces the policy at step 20 by restricting or relaxing access to objects or allows the user to continue in the current mode uninterrupted.

To implement restricted access to this data, the method 10 can, for instance, render on the user's screen a version of the document/object with portions either "blacked out" or simply not accessible in some manner. Techniques for limiting access as indicated in step 22 include (but are not limited to):

a) Blacking-out sensitive data (for text or graphical objects) or including 'white noise' gaps in audio or video objects b) Replacing sensitive data with innocuous data (e.g., 'Restricted', if a text object)

c) Prohibiting access to the object (i.e., user is aware of its existence, but cannot access it)

d) Hiding the object from the user (i.e., casual user/observer is not even aware of its existence)

Rules enforcement may take a number of different forms. The preferred embodiment would be one in which, upon detection of a user's attempt to access a document, file or object, the service would prompt the user to remind him/her of the corporate policy regarding confidential material as shown at optional step 24. The service can further challenge the user to provide authentication at step 26. The process of verifying that the person with whom a system is communicating or conducting a transaction is, in fact, that specific individual is referred to as authentication. Authentication is a process that can be accomplished using one of three approaches as indicated by step 28 where either a) unique knowledge (something the individual knows such as a pin number) b) a unique possession (something the individual has such as an access card) or c) a unique characteristic (something physiologically unique about the individual such as a fingerprint, voiceprint, or retinal scan). This method can utilize any combination of these three approaches. For instance, it may verify identity in the form of a password challenge, fingerprint identification, retinal scan or similar biometric technology.

Having authenticated the individual in question as well as his/her location, the method 10 can utilize a set of keywords and/or object properties/attributes which are deemed to be sensitive or confidential. The description of these keywords or properties may be defined in the corporate policy or may be simply referenced in the policy and defined elsewhere, for instance in an industry-standard attribute repository. The invention acquires this data by accessing either the policy or the standard repository.

Figure 2:
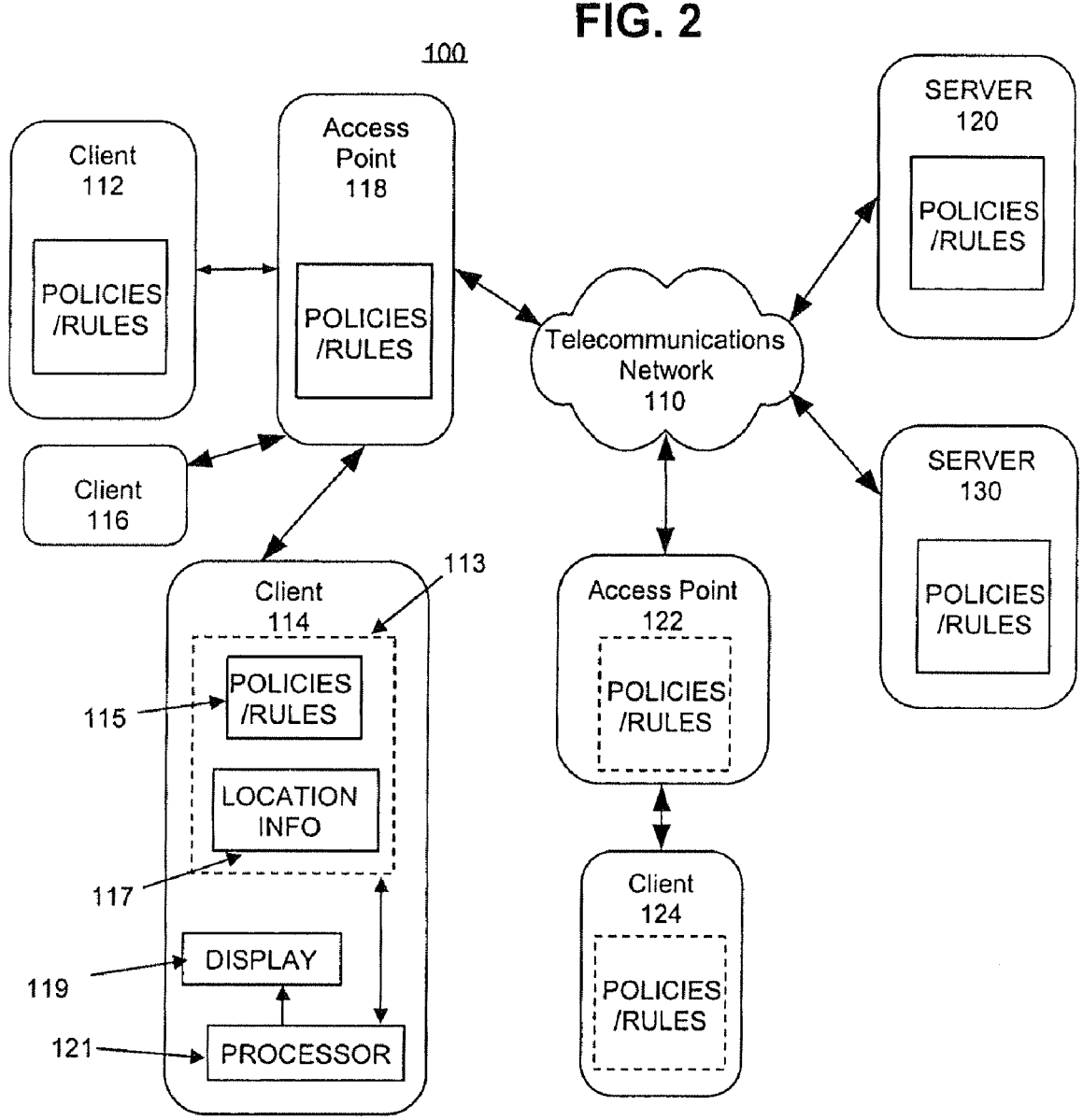
FIG. 2 is an exemplary system for managing the display of sensitive content in non-trusted environments in accordance with the present invention.

Next, the method can access the objects that the user may access, prior to providing the user full access to any of those objects. Those objects may already be 'open', for instance in a GUI-based operating system. The method would then apply the specific policy elements, which can take any of several forms. (In each case, the method itself requires access to all possible sensitive objects as well as their internal formats, since the method needs to be aware of the structure of each object in order to parse it, 'understand' its components and take fine-grained action.) Examples of object attributes that may be restricted include (but are not limited to): a) Corporate revenue information b) Customer names c) Company names d) Personnel information Referring to FIG. 2, a system 100 for managing the display of sensitive content in non-trusted environments can include a memory 113, a display 119, and a processor 121 coupled to the memory and the display. The memory 113, display 119, and processor 121 can be part of any number of client devices (112, 114, 116, 124) such as laptops and PDAs. The processor 119 can be programmed to interrogate a list of policies 115 associated with a given user and a physical device, determine a location of the physical device, compare the location of the physical device with a list of trusted locations, and enforce a plurality of rules contained in the policy, wherein access to sensitive information is limited or restricted based on the location. The location information 117 can be obtained using any number of location finding schemes including GPS and wireless infrastructure as previously mentioned. The policies can be stored locally in the client devices or at remote servers 120 or 130 or even at trusted access points 118 or 124 coupled to the servers via a network 110.

This system 100 also contemplates a public, subscription-based service which employ a list of employee name/ids, machine identification information from multiple organizations. The service would use GPS technology and tables of machine addresses and corresponding users and organizations. For example, the service could use this data to alert a user (who is viewing a confidential document) when someone from a competitive firm was in their proximity. The user could define a profile which would specify which companies are considered competitive and within what proximity to be notified. This proximity and competitive information could also be acquired via access to a corporate policy, rather than from a given user.

Further, a corporation could provide role-based user capabilities as an enhancement to the basic service. For example, if an employee were to attempt to open a confidential document he/she could be granted the ability to override the policy with a password, thumb print, retinal scan, etc., as described above. The company could set up roles based on job title, band level, years of experience, etc. For example, all employees below a certain seniority or pay grade level might not be permitted to override a corporate policy. Conversely, employees with higher rank would be permitted to override corporate policy, pending presentment of the proper authentication credentials. This capability would prevent confidential documents from being seen inadvertently, while allowing highly-trusted employees that ability to share otherwise-prohibited information with other employees, business partners, etc.

In summary, this system can provide several features allowing organizations to restrict access to machines, objects or even sensitive data elements of single objects by utilizing both corporate policies and users' physical location. The policies are applied to persons with differing access capabilities and enforced by utilizing authentication mechanisms.

It should be understood that the present invention can be realized in hardware, software, or a combination of hardware and software. The present invention can also be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A system for managing a presentation of sensitive content in non-trusted environments, comprising:
    a memory;
    a display; and
    a processor coupled to the memory and the display, wherein the processor is programmed to:
        interrogate a list of one or more corporate policies associated with a given user and a physical device, the policy data being acquired locally from the physical device or dynamically via access to a corporate network, each corporate policy prohibiting or restricting access to corporate data in a non-trusted environment;
        determine a location of the physical device;
        determine whether the user and the physical device is in a trusted or non-trusted environment by comparing the determined location of the physical device with a list of trusted locations, the list of trusted locations being embedded within the policy data or stored separately;
        access a subscription-based service that maintains an organization list of individuals and machine identification information indicating that a listed individual or machine is associated with a predetermined organization;
        determine that an individual or machine identified on the list associated with a competitive organization is within a predetermined proximity of the physical device, and in response thereto, transmitting an alert to the physical device; and
        enforce a plurality of rules contained in the corporate policy for managing the presentation of sensitive content by blocking a visual presentation or audible presentation of at least one object in portions of the presentation if the physical device is not located in a trusted location or if an individual or a machine identified on the competitive organization list is within a predetermined proximity of the physical device.

2. The system of claim 1, wherein the processor is further programmed to provide a reminder of the policy regarding confidential material to the given user in response to an attempt to access sensitive information on the physical device.

3. The system of claim 1, wherein the processor is further programmed to request authentication from the given user in response to an attempt to access sensitive information in an open application on the physical device.

4. The system of claim 3, wherein the processor requests authentication by requesting at least one among the provision of a unique password for the given user, a unique accessing device, or a unique biometric characteristic of the given user.

5. The system of claim 1, wherein the processor determines the location by using at least one among a global positioning system and a terrestrial wireless infrastructure system to provide the location of the physical device.

6. The system of claim 1, wherein the processor enforces the policies by at least one among blacking out a visual object in a display during the presentation, replacing a visual object with innocuous content during the presentation, visually hiding the at least one object from the given user during the presentation and inserting audio 'white noise' gaps in an audio object.

7. A machine-readable storage, having stored thereon a computer program having a plurality of code sections executable by a machine for causing the machine to perform the steps of:
    interrogating a list of one or more corporate policies associated with a given user and a physical device, the policy data being acquired locally from the physical device or dynamically via access to a corporate network, each corporate policy prohibiting or restricting access to corporate data in a non-trusted environment;
    determining a location of the physical device;
    determining whether the user and the physical device is in a trusted or non-trusted environment by comparing the determined location of the physical device with a list of trusted locations, the list of trusted locations being embedded within the policy data or stored separately;
    providing access to a subscription-based service that maintains an organization list of individuals and machine identification information indicating that a listed individual or machine is associated with a predetermined organization;
    determining that an individual or machine identified on the list associated with a competitive organization is within a predetermined proximity of the physical device, and in response thereto, transmitting an alert to the physical device; and
    enforcing a plurality of rules contained in the corporate policy for managing the presentation of sensitive content by blocking a visual presentation or audible presentation of at least one object in portions of the presentation if the physical device is not located in a trusted location or if an individual or a machine identified on the competitive organization list is within a predetermined proximity of the physical device.

8. The machine-readable storage of claim 7, wherein the computer program further comprises a plurality of code sections for causing the machine to provide a reminder of the policy regarding confidential material to the given user in response to an attempt to access sensitive information on the physical device.

9. The machine-readable storage of claim 7, wherein the computer program further comprises a plurality of code sections for causing to request authentication from the given user in response to an attempt to access sensitive information in an open application on the physical device.

10. The machine-readable storage of claim 9, wherein the computer program requests authentication by requesting at least one among a provision of a unique password for the given user, a unique accessing device, or a unique biometric characteristic of the given user.

11. The machine-readable storage of claim 7, wherein the computer program determines a location by using at least one among a global positioning system and a terrestrial wireless infrastructure system to provide the location of the physical device.

12. The machine-readable storage claim 7, wherein the computer program enforces the policy by at least one among blacking out a visual object in a display during the presentation, replacing a visual object with innocuous content during the presentation, visually hiding the at least one object from the given user during the presentation and inserting audio 'white noise' gaps in an audio object.

* * * * *